(12) United States Patent
Kelk

(10) Patent No.: US 10,094,503 B2
(45) Date of Patent: Oct. 9, 2018

(54) SEWER PIPE FITTING ASSEMBLY

(71) Applicant: Brian John Kelk, Millarville (CA)

(72) Inventor: Brian John Kelk, Millarville (CA)

( * ) Notice: Subject to any disclaimer, the term of this patent is extended or adjusted under 35 U.S.C. 154(b) by 214 days.

(21) Appl. No.: 15/001,982

(22) Filed: Jan. 20, 2016

(65) Prior Publication Data

US 2017/0205014 A1 Jul. 20, 2017

(51) Int. Cl.
*F16L 41/14* (2006.01)
*F16L 37/091* (2006.01)
*F16L 37/00* (2006.01)

(52) U.S. Cl.
CPC .............. *F16L 41/14* (2013.01); *F16L 37/008* (2013.01); *F16L 37/091* (2013.01)

(58) Field of Classification Search
CPC ........ F16L 41/14; F16L 37/091; F16L 41/088
USPC ................ 285/202, 203, 204, 206, 208, 214
See application file for complete search history.

(56) References Cited

U.S. PATENT DOCUMENTS

| | | | | |
|---|---|---|---|---|
| 3,181,899 A * | 5/1965 | McKight, Jr. | ............ | F16L 41/14 285/208 |
| 6,192,531 B1 * | 2/2001 | Fritz | .......................... | E03C 1/24 285/206 |
| 6,406,068 B1 * | 6/2002 | Bartholoma | .............. | F16L 5/14 285/208 |
| 8,328,240 B2 * | 12/2012 | Stone | ....................... | F16L 41/14 285/208 |
| 8,807,601 B2 * | 8/2014 | Anderson | ................. | F16L 5/06 285/208 |
| 2003/0127853 A1 * | 7/2003 | Haymon | ................. | F16L 41/14 285/205 |
| 2008/0030021 A1 * | 2/2008 | Theilen | .................... | F16L 41/14 285/5 |

FOREIGN PATENT DOCUMENTS

| | | | | | |
|---|---|---|---|---|---|
| DE | 10032010 C1 | * | 9/2001 | .............. | F16L 41/14 |
| DE | 202014100099 U1 | * | 1/2014 | .............. | F16L 41/14 |
| DE | 202015103295 U1 | * | 8/2015 | .............. | F16L 41/14 |
| DE | 202016106327 U1 | * | 11/2016 | ............. | F16L 41/088 |
| EP | 0967701 A2 | * | 12/1999 | .............. | F16L 41/14 |
| EP | 1172596 A1 | * | 1/2002 | .............. | F16L 41/14 |
| WO | WO-2014085867 A1 | * | 6/2014 | .............. | F16L 41/14 |

* cited by examiner

*Primary Examiner* — David Bochna
(74) *Attorney, Agent, or Firm* — Olive Law Group, PLLC

(57) ABSTRACT

A fitting assembly for establishing a fluid-tight connection with a pipe, the pipe having an aperture in a sidewall thereof, an inner surface, and an outer surface. The assembly comprises at least one adapting member, an internal sealing member disposed about the adapting member adjacent a distal end thereof, compression member disposed about the adapting member adjacent a proximal end thereof, and an external sealing member disposed about the adapting member between the internal sealing member and compression member. The distal end of the adapting member comprises teeth with outwardly extending flanged ends for insertion in the pipe aperture. Operation of the compression member causes the components to exert a compressive force on the sidewall of the pipe, forming the seal.

15 Claims, 4 Drawing Sheets

SEWER PIPE FITTING ASSEMBLY

BACKGROUND OF THE INVENTION

Field of the Invention

This invention is directed toward a sewer pipe fitting assembly for establishing a fluid-tight connection with the side wall of a sewage pipe.

Description of the Related Art

Repair and alteration of sewer and other fluid transport systems is a vital component of infrastructure maintenance and improvement. Accordingly, it is often necessary as systems expand or undergo changes to create new branches to redirect fluid, such as to new sewer services that are being connected to existing sewer pipes.

Currently, such alterations are very expensive and time-consuming. They typically require excavating a site to establish access to the existing pipe, which can require cutting through pavement and other surface improvements. Current methods also require significant excavation so as to expose a large surface area of the pipe for connecting a branch. The risks associated with excavation are magnified in the case of aged infrastructure, particularly for clay tile pipes, as wear and tear often renders the pipe brittle and particularly susceptible to damage. In addition, excavating and branching the pipe is a very time-consuming process that can easily require a crew of more than a half dozen workers and heavy machine operators, costing thousands of dollars per hour. And, once the branch is established, the excavation site has to be refilled and any surface improvements restored. Large excavation sites carry a risk of settling and shifting in filling materials, often necessitating further repair well after the primary job of branching the pipe has been completed.

Moreover, the pipe fittings currently used to establish a branch connection are typically friction fit or mechanical created pressure, which stress the pipe and can easily damage it.

What is needed in the art is an adapter that requires exposure of less of the surface area of the pipe to be branched, thereby significantly reducing deployment time as well as installation and repair costs. Such an adapter may use compression, as opposed to friction or mechanical pressure, to establish a fluid-tight seal with the pipe, which has the added benefit of potentially reinforcing the sidewall of the pipe.

SUMMARY OF THE INVENTION

The present invention is directed toward a fitting assembly for establishing a fluid-tight connection with a pipe that has an aperture in a sidewall thereof. The fitting assembly comprises an adapting member that has an inner passage. Insertion of the fitting assembly accordingly establishes a fluid connection with the interior of the assembly and the pipe, allowing for a branch to be established.

The distal end of the adapting member comprises a plurality of teeth that are transversely oriented about the circumference of the adapting member. The proximal ends of the teeth are interconnected to the adapting member. The distal ends each terminate in a flange that extends radially outward in transverse orientation relative to the adapting member. in a. The collective circumference of the teeth is greater than the diameter of the aperture in the pipe. Operation of the teeth in a "compressed" state, such as by squeezing them so as to reduce their circumference below that of the aperture, allows the teeth to be inserted through the pipe aperture. The teeth are biased such that, once released, they return to a "neutral" state whereby their collective circumference is again larger than that of the aperture, preventing removal of the adapting member from the sidewall. The proximal surfaces of the teeth engage the internal sealing member to facilitate its sealing relationship against the interior sidewall of the pipe.

An internal sealing member, which may be of annular construction, is disposed about the adapting member adjacent its proximal end. The proximal end of the adapting member and the internal sealing member are thus inserted through the aperture in the pipe. When the assembly is deployed, the internal sealing member abuts the interior of the sidewall of the pipe.

The assembly further comprises at least one internal sealing member disposed about the adapting member adjacent a distal end thereof. When the assembly is deployed, the internal sealing member abuts the exterior of the sidewall of the pipe.

A compression member is disposed about the adapting member on the opposite side of the external sealing member and is movable longitudinally along the length of the adapting member. Operating the compression member in the direction of the pipe causes a force to be applied that brings the sealing members closer to the pipe wall, applying a compressive force to the wall and forming a fluid-tight seal. To further the integrity of the seal, a second external sealing member may be disposed about the adapting member between the first external sealing member and the compression member.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Both the foregoing general description and the following detailed description are exemplary and explanatory only and are not restrictive of the invention claimed. As used herein, "or" means "and/or" unless expressly stated otherwise. Furthermore, the use of the singular includes the plural unless specifically stated otherwise, and use of the term "including" as well as other forms, such as "includes," and "included," shall not be considered limiting.

Figure 1:
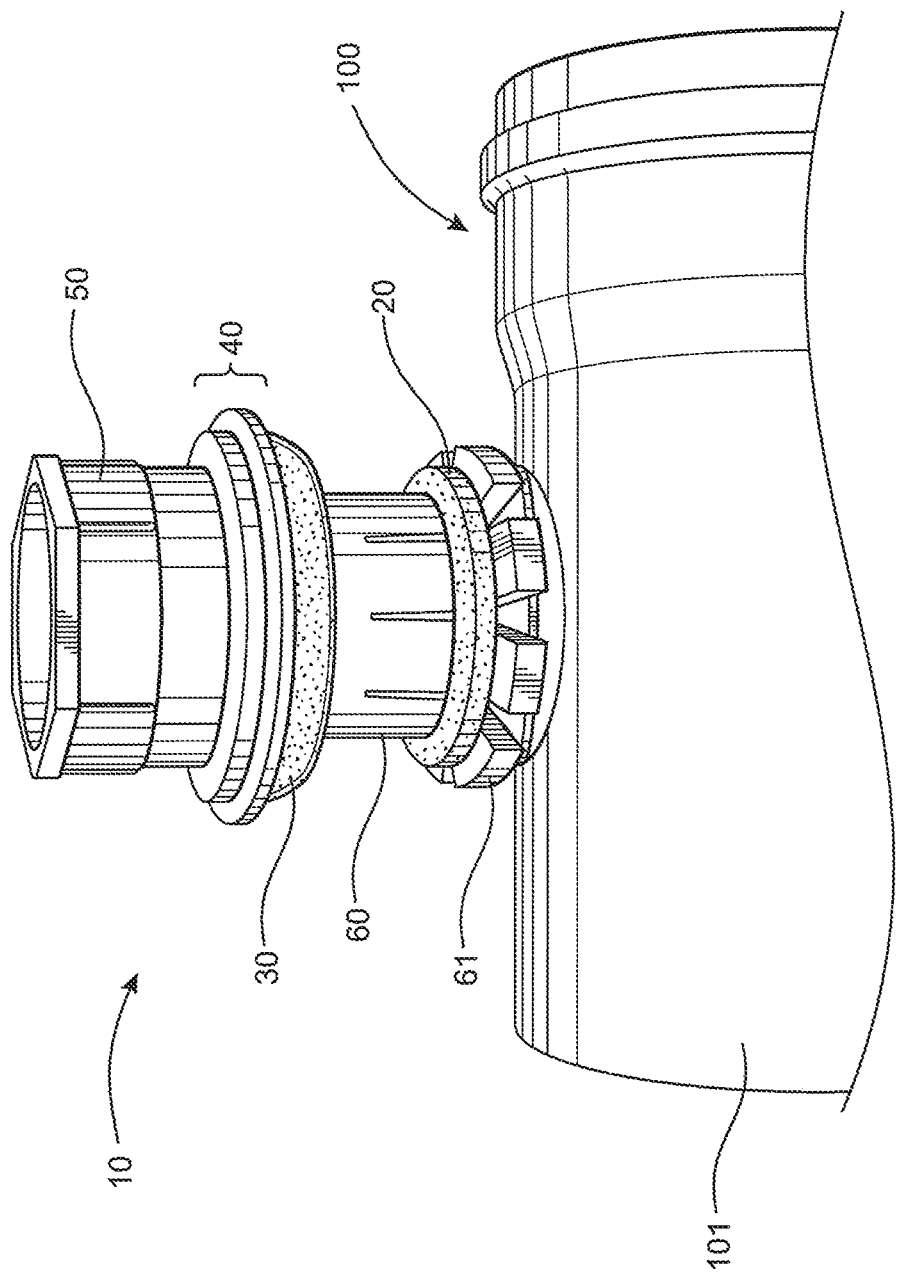
FIG. 1 is a perspective view of an embodiment of the present invention in a pre-deployment state.

As represented in the accompanying drawings, the present invention is directed to a fitting assembly for establishing a fluid-tight connection with a pipe. With reference to FIG. 1, the assembly 10 comprises an adapting member 50. At least a portion of the distal end 50" of the adapting member 50 is dimensioned or otherwise structured for insertion in to a pipe 100. The pipe 100. may be for example, an existing sewer main. The pipe 100 comprises an aperture 102 in the sidewall 101 thereof. The proximal end 50' of the adapting member 50 is structured to receive an insert pipe (discussed further herein below) to establish a branch connection with the pipe 100.

Figure 2:
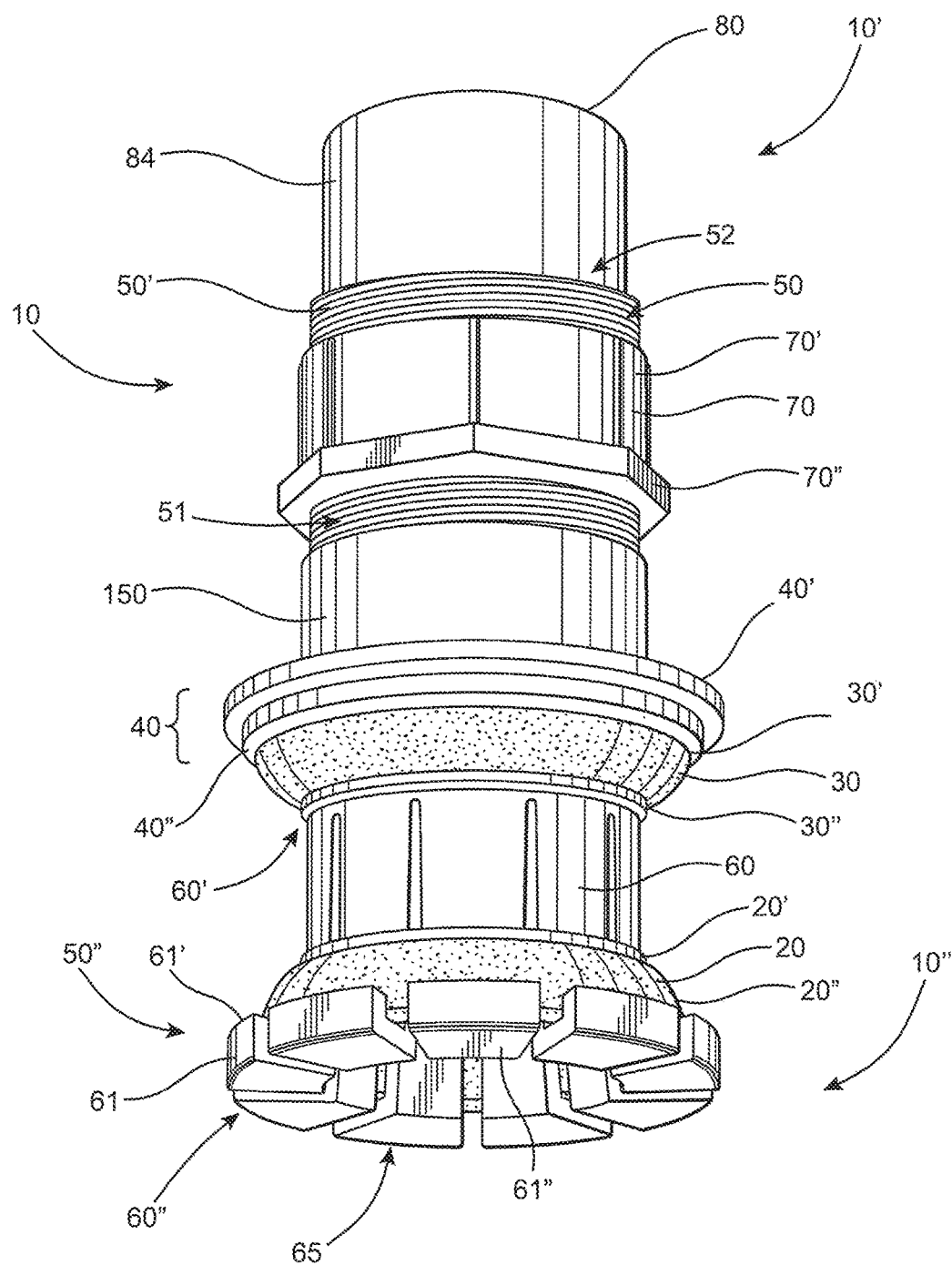
FIG. 2 is a perspective view of the embodiment of FIG. 1.

With reference to FIG. 2, the assembly comprises an internal sealing member 20, a first external sealing member 30, and a compression member 70, each of which be discussed in turn. Additionally, the assembly may comprise a second external sealing member 40. The members 20, 30, 40, 70 are movable along the length of the adapting member. Additionally, they may be of an annular construction so as to facilitate their disposition about the adapting member 50 as shown in FIG. 2.

The distal end 50" of the adapting member 50 comprises at least one tooth 60 interconnected with the adapting member 50.

With further reference to FIG. 2, at least one embodiment comprises a plurality of such teeth 60. The teeth 60 each have a flange 61. The flanges 61 protrude radially relative to the length of the adapting member. A proximal surface 61' of the flanges 60 is dimensioned or otherwise structured to engage the distal surface 20" of the internal sealing member 20 in movement-restricting relationship when the assembly 10 is deployed and the flanges 60 are disposed in the interior of the pipe 100, as discussed below.

In addition, the teeth 60 are operable between a "compressed" and a "neutral" state. When in a neutral state, the flanges 61 collectively comprise an outermost circumference larger than the circumference of the aperture 102, as is apparent in FIG. 4. The teeth 60 may transition to the compressed state by way of application of a radially applied force directed toward their collective center. To facilitate such operation, the teeth 60 may comprise a pliable material. When in a compressed state, as shown in FIG. 2, the collective circumference is smaller than that of the aperture 102, therefore allowing insertion of the teeth 60 at least partially into the interior of the pipe 100. The teeth 60 may also be biased such that upon release of the aforementioned compressive force, the teeth 60 return to the neutral state.

Returning to FIG. 1, the internal sealing member 20 is disposed about the adapting member 50. The internal sealing member 20 may be of an elastomeric construction. The proximal surface 20' of the internal sealing member 20 is structured to abut an inner surface of the sidewall 101 of the pipe 100 so as to form a sealing relation therewith.

The first external sealing member 30 is disposed about the adapting member 50 and may be of an elastomeric construction. A distal surface 30" is structured to abut the outer inner surface of the sidewall 101 of the pipe 100 so as to form a sealing relation therewith.

The assembly 10 in at least one embodiment comprises a second external sealing member 40 disposed adjacent the first external sealing member 30, such that the distal surface 40" of the second external sealing member 40 abuts the proximal surface 30' of the first sealing member when the assembly 10 is deployed. As shown in the embodiment of FIG. 2, the second external sealing 40 member may have an outer circumference that is greater than that of the first external sealing member 30. Accordingly, the distal surface 40" may be contoured or otherwise structured to fit flush against the exterior of the sidewall 101 of the pipe to further facilitate a sealing relation.

A compression member 70 is disposed about the adapting member 50 such that its distal surface 70" is adjacent the proximal surface 40' of the second external sealing member 40. The compression member 70 is operable so as to move along the length of the adapting member 50. The movement of the compression member 70 toward the distal end 50" of the adapting member 50 accordingly applies a compressive force on the other components as described below.

In at least one embodiment, a sleeve 150 is disposed between the compression member 70 and second external sealing member 40. The sleeve 150 is movable along the length of the adapting member 50. The dimensions of the sleeve 150 are such that the sleeve 50 is at least partially disposable between the external compression members 40, 60 and the adapting member 50, so as to cover the threads 51 and protect the compression members 40, 60 from the contact with the threads 51.

Returning to FIG. 1, the assembly 10 is depicted in a pre-insertion state. A space between the internal sealing member 20 and first external sealing member 30 may be left to facilitate accommodation of the sidewall 101 of the pipe 100 between these members 20, 30.

Figure 4:
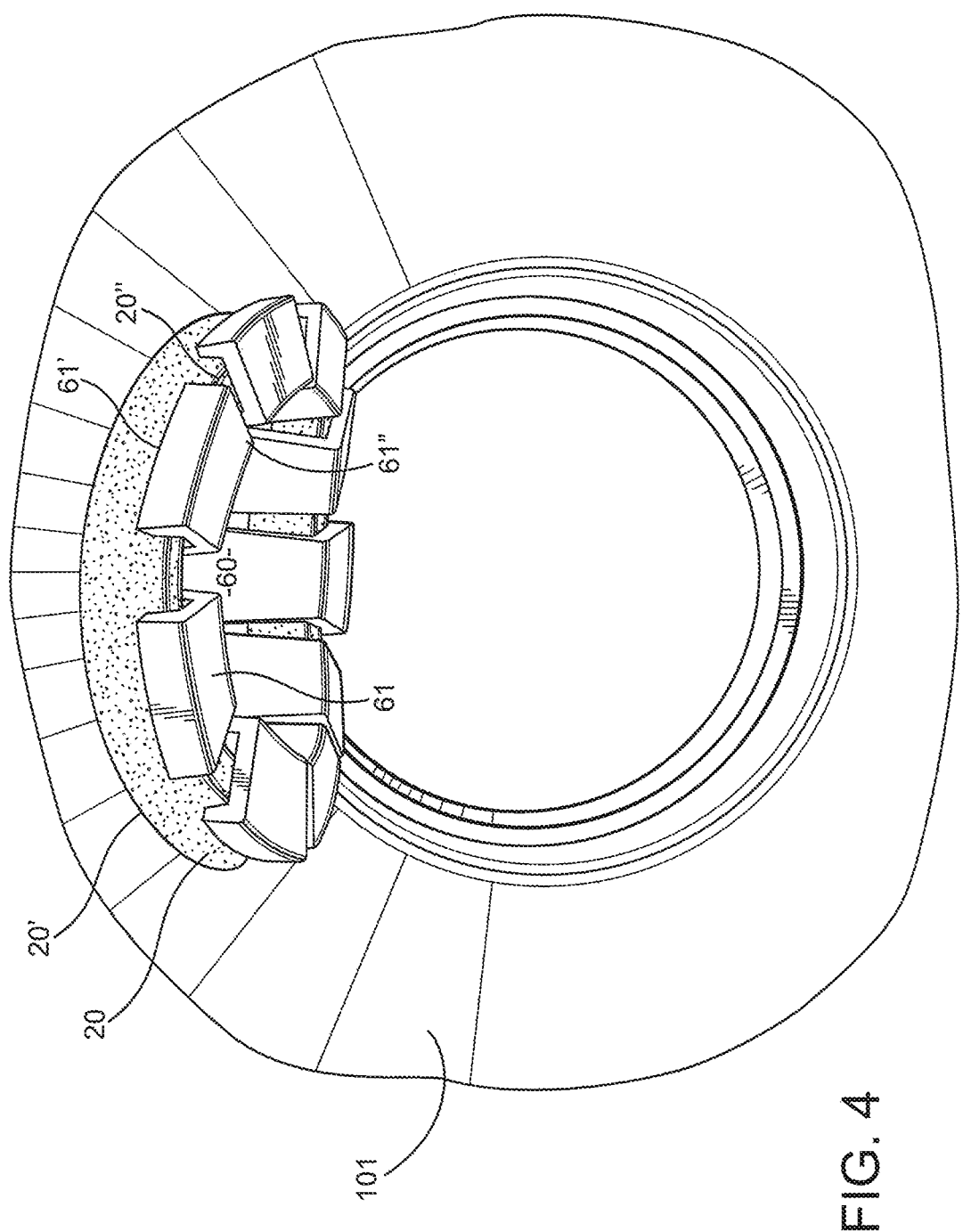
FIG. 4 is a perspective view of the inside of the pipe showing selected components of the embodiment of FIG. 1 in a deployed state.

Turning to FIG. 4, the assembly 10 is depicted in a deployed state, after insertion of at least a portion of the teeth 60 through the aperture 102. The proximal surfaces 61' of the teeth's 60 flanges 61' thus engage the internal sealing member 20 to the interior surface of the sidewall 101 of the pipe 100 to form the above described sealing relation. This sealing relation prevents the flow of the contents of the pipe 100, such as fluid or gas, through the area where the internal sealing member 20 contacts the sidewall 101.

Figure 3:
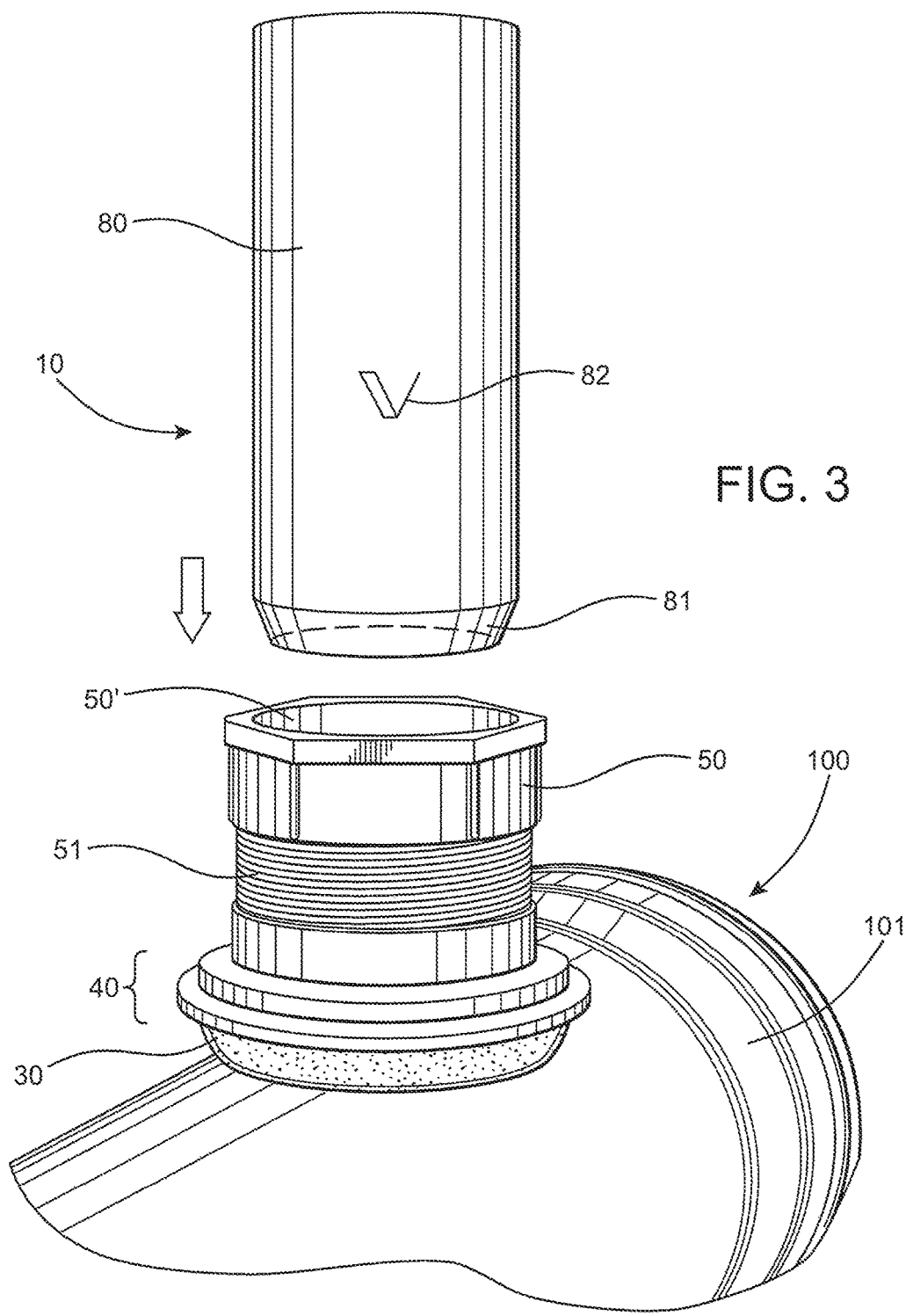
FIG. 3 is a perspective view of the outside of the pipe showing selected components of the embodiment of FIG. 1 in a deployed state.

FIG. 3 depicts the assembly 10 in a deployed state. Operation of the compression member 70 in the direction of the pipe 100 applies a compressive force along the length of the adapting member 50. The operation of the compression member 70 may be achieved by way of a threads 51 on the adapting member 50. Accordingly, operation of the compression member 70 may include rotating it about an axis aligned with that of the adapting member 50 in a screw-like fashion. However, other suitable methods of moving the compression member 70 along the length of the adapting member 50 may be employed. The compression member 70 in FIG. 3 is engaged in a movement restricting relation relative to the sealing members 20, 30, 40 so as to maintain a compressive force. Accordingly, the compressive force exerted by the compression member 70 facilitates the sealing relation of the respective sealing members 20, 30, 40 formed with the sidewall 101.

Once deployed, an insert pipe 80 may be inserted into the proximal end 50' of the adapting member 50, and thereby establish fluid communication with the interior of the pipe 100. Moreover, when inserted, the insert pipe 80 and adapting member 50 may form a movement restrictive relationship whereby the insert pipe 80 cannot be removed from the adapting member 50. With reference to FIG. 2, insertion of the insert pipe 80 may also result in at least a portion thereof abutting the inner surface 65 of the teeth 60. In addition, insertion of the insert pipe 80 may serve to structurally reinforce the assembly 10. The insert pipe 80 may also comprise a contoured end 81. The adapting member 50 may be correspondingly structured to receive the contoured end 81. In addition, indicia 82 may be provided on the insert pipe 80 to assist with proper alignment of the pipe relative to the adapting member 50. Adhesive may be applied to an outer surface 84 of the insert pipe 80, the inner surface 52 of the adapting member 50, and/or the inner surface 65 of the teeth 60 so as to facilitate the movement restricting relationship.

Once inserted, the insert pipe 80 can receive a connection by way of its receiving end 82, which may be flared to further facilitate connection therewith.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described.

What is claimed is:

1. A fitting assembly for establishing a fluid-tight connection with a pipe, the pipe having an aperture in a sidewall thereof, an inner surface, and an outer surface, said fitting assembly comprising:
    at least one adapting member,
    at least one internal sealing member disposed about said adapting member adjacent a distal end thereof,
    at least one compression member disposed about said adapting member adjacent a proximal end thereof,
    at least one external sealing member disposed about said adapting member between said internal sealing member and said compression member,
    said distal end of said adapting member comprising at least one tooth, said tooth having an outwardly extending flanged end,
    a circumference of a portion of said at least one adapting member situate between said at least one internal sealing member and said at least one external sealing member being smaller than a circumference of a wall of said aperture, thus configured for non-engagement of said portion with said wall during and after said fluid-tight connection, and
    wherein said internal sealing member, said compression member, and said external sealing member are movable longitudinally along said adapting member.

2. The fitting assembly of claim 1, wherein said distal end of said adapting member further comprises a plurality of teeth, each having an outwardly extending flanged end.

3. The fitting assembly of claim 2, wherein said plurality of teeth are disposed in transverse orientation relative to the length of said adapting member.

4. The fitting assembly of claim 3, wherein said flanged ends collectively extend the majority of the circumference of said adapting member.

5. The fitting assembly of claim 4, wherein said flanged ends collectively extend the entirety of the circumference of said adapting member.

6. The fitting assembly of claim 2, wherein said flanged ends are arranged in equivalently spaced relation relative to one another.

7. The fitting assembly of claim 1, wherein said internal sealing member comprise a proximal surface and a distal surface opposite said proximal surface, and said proximal surface of said internal sealing member is structured to fit in a sealing relation against the inner wall of the pipe.

8. The fitting assembly of claim 7, wherein said internal sealing member comprises an elastomeric material.

9. The fitting assembly of claim 1, wherein said external sealing member comprise a proximal surface and a distal surface opposite said proximal surface, and wherein said distal surface of said external sealing member is structured to fit in a sealing relation against the outer wall of the pipe.

10. The fitting assembly of claim 9, wherein said external sealing member comprises an elastomeric material.

11. The fitting assembly of claim 1 further comprising a second external sealing member disposed about said adapting member between said compressing member and said external sealing member.

12. The fitting assembly of claim 11, wherein said second external sealing member is movable longitudinally along said adapting member.

13. The fitting assembly of claim 12, wherein said internal sealing member comprises an elastomeric material.

14. A fitting assembly for establishing a fluid-tight connection with a pipe, the pipe having an aperture in a sidewall thereof, an inner surface, and an outer surface, said fitting assembly comprising:
    at least one adapting member,
    at least one internal sealing member disposed about said adapting member adjacent a distal end thereof,
    at least one compression member disposed about said adapting member adjacent a proximal end thereof,
    a first external sealing member disposed about said adapting member between said internal sealing member and said compression member,
    a second external sealing member disposed about said adapting member between said compressing member and said first external sealing member,
    said distal end of said adapting member comprises a plurality of teeth, each having a radially extending flanged end,
    a circumference of a portion of said at least one adapting member situate between said at least one internal sealing member and said first external sealing member being smaller than a circumference of a wall of said aperture, thus configured for non-engagement of said portion with said wall during and after said fluid-tight connection, and
    wherein said internal sealing member, said compression members, and said external sealing member are movable longitudinally along said adapting member.

15. The assembly of claim 14 wherein said teeth are operable between a neutral state and a compressed state, wherein said flanged ends have a collective outer circumference that is greater than a circumference of the aperture in the sidewall of the pipe when said teeth are in said neutral state and that is less than a circumference of the aperture in the sidewall of the pipe when said teeth are in a compressed state, and wherein said teeth are biased toward said neutral state.

* * * * *